US010623571B2

(12) United States Patent
Griesmer et al.

(10) Patent No.: US 10,623,571 B2
(45) Date of Patent: *Apr. 14, 2020

(54) AUTOMATED ASSISTANCE FOR CUSTOMER CARE CHATS

(71) Applicant: [24]7.ai, Inc., San Jose, CA (US)

(72) Inventors: Stephen J. Griesmer, Westfield, NJ (US); James Gordon Beattie, Jr., Bergenfield, NJ (US); Charles Richard Cooke, Elmwood Park, NJ (US); Monowar Hossain, Middletown, NJ (US); Steven H. Lewis, Middletown, NJ (US); Benjamin Rudman, Monsey, NY (US)

(73) Assignee: [24]7.ai, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,713

(22) Filed: Jul. 10, 2018

(65) Prior Publication Data

US 2018/0324301 A1 Nov. 8, 2018

Related U.S. Application Data

(63) Continuation of application No. 15/424,729, filed on Feb. 3, 2017, now Pat. No. 10,051,123, which is a (Continued)

(51) Int. Cl.
*H04M 3/51* (2006.01)
*H04L 12/64* (2006.01)
(Continued)

(52) U.S. Cl.
CPC ...... *H04M 3/5191* (2013.01); *H04L 12/6418* (2013.01); *H04L 51/02* (2013.01);
(Continued)

(58) Field of Classification Search
CPC .. H04M 3/5133; H04M 3/493; H04M 3/4933; H04M 3/5166
See application file for complete search history.

(56) References Cited

U.S. PATENT DOCUMENTS 4,763,353 A 8/1988 Canale et al.
5,241,588 A 8/1993 Babson, III et al.
(Continued)

OTHER PUBLICATIONS

Klevjer, Rune, "What is the Avatar? Fiction and Embodiment in Avatar-Based Singleplayer Computer Games", Dissertation for the degree doctor rerum politicarum (dr.polit.), Dept. of Info. Science and Media Studies, University of Bergen, Submitted Jul. 14, 2006, pp. 1-229.

(Continued)

*Primary Examiner* — Nafiz E Hoque
(74) *Attorney, Agent, or Firm* — Perkins Coie LLP

(57) ABSTRACT

Embodiments of the invention involve providing automated assistance to an agent operating an agent terminal. A database stores an automated assistance session comprising communications between at least one client terminal and at least one agent terminal during a communication session. The automated assistance session is restored in response to a connection being reestablished with the client terminal after the client terminal disconnects during the communication session. A client communication is received from the client terminal, and a plurality of statements is determined based on the client communication and the communications of the automated assistance session stored in the database. The statements are configured to be manually selected by an agent or automatically selected by an automated agent. The automated agent is engaged for automatically selecting one of the statements in response to a predetermined condition.

23 Claims, 5 Drawing Sheets

Related U.S. Application Data continuation of application No. 14/739,234, filed on Jun. 15, 2015, now Pat. No. 9,635,176, which is a continuation of application No. 12/899,042, filed on Oct. 6, 2010, now Pat. No. 9,083,561.

(51) Int. Cl.
*H04M 3/493* (2006.01)
*H04L 12/58* (2006.01)

(52) U.S. Cl.
CPC ......... *H04M 3/493* (2013.01); *H04M 3/5133* (2013.01); *H04M 3/5166* (2013.01); *H04M 3/4933* (2013.01); *H04M 2203/551* (2013.01); *H04M 2203/558* (2013.01)

(56) References Cited

U.S. PATENT DOCUMENTS

| | | | |
|---|---|---|---|
| 5,422,936 A | 6/1995 | Atwell | |
| 5,970,134 A | 10/1999 | Highland et al. | |
| 5,999,908 A | 12/1999 | Abelow | |
| 6,016,520 A | 1/2000 | Facq et al. | |
| 6,337,906 B1 | 1/2002 | Bugash et al. | |
| 6,690,788 B1 | 2/2004 | Bauer et al. | |
| 6,747,970 B1 | 6/2004 | Lamb et al. | |
| 6,883,014 B1 | 4/2005 | McErlean | |
| 7,177,798 B2 | 2/2007 | Hsu et al. | |
| 7,640,427 B2 | 12/2009 | Callas et al. | |
| 7,650,381 B2 | 1/2010 | Peters | |
| 8,005,896 B2 | 8/2011 | Cheah | |
| 8,054,951 B1 | 11/2011 | Winslow et al. | |
| 8,081,749 B1 | 12/2011 | Shaffer et al. | |
| 8,166,173 B2 | 4/2012 | Low et al. | |
| 8,214,441 B2 | 7/2012 | Bangalore et al. | |
| 8,396,777 B1 | 3/2013 | Fine et al. | |
| 8,472,590 B1 | 6/2013 | Curtis et al. | |
| 8,605,885 B1 | 12/2013 | Wooters et al. | |
| 9,083,561 B2 | 7/2015 | Griesmer et al. | |
| 9,214,001 B2 | 12/2015 | Rawle | |
| 2002/0059069 A1 | 5/2002 | Hsu et al. | |
| 2002/0095572 A1 | 7/2002 | Frank et al. | |
| 2002/0103809 A1 | 8/2002 | Starzl et al. | |
| 2002/0146668 A1* | 10/2002 | Burgin ............... G06F 17/30873 434/118 |
| 2002/0147848 A1 | 10/2002 | Burgin et al. | |
| 2002/0178226 A1 | 11/2002 | Anderson et al. | |
| 2003/0187672 A1 | 10/2003 | Gibson et al. | |
| 2003/0204573 A1 | 10/2003 | Beck et al. | |
| 2003/0229900 A1 | 12/2003 | Reisman | |
| 2004/0098476 A1 | 5/2004 | Kawase et al. | |
| 2004/0172558 A1 | 9/2004 | Callahan et al. | |
| 2004/0249510 A1 | 12/2004 | Hanson et al. | |
| 2005/0060283 A1 | 3/2005 | Petras et al. | |
| 2005/0144067 A1 | 6/2005 | Farahat et al. | |
| 2005/0172311 A1 | 8/2005 | Hjelt et al. | |
| 2005/0203782 A1 | 9/2005 | Smith | |
| 2006/0018281 A1 | 1/2006 | Sadot et al. | |
| 2006/0075039 A1* | 4/2006 | Narayanaswami .. G06Q 10/107 709/206 |
| 2006/0080368 A1 | 4/2006 | Orumchian et al. | |
| 2006/0253583 A1 | 11/2006 | Dixon et al. | |
| 2006/0285657 A1 | 12/2006 | Lippke et al. | |
| 2007/0050191 A1 | 3/2007 | Weider et al. | |
| 2007/0074114 A1 | 3/2007 | Adjali et al. | |
| 2007/0203785 A1 | 8/2007 | Thompson et al. | |
| 2007/0233846 A1 | 10/2007 | Farber et al. | |
| 2008/0021999 A1 | 1/2008 | Mohan | |
| 2008/0043987 A1 | 2/2008 | Waalkes et al. | |
| 2008/0086254 A1 | 4/2008 | Anderson et al. | |
| 2008/0088454 A1 | 4/2008 | Flores et al. | |
| 2008/0091767 A1 | 4/2008 | Afergan et al. | |
| 2008/0092058 A1 | 4/2008 | Afergan et al. | |
| 2008/0095355 A1 | 4/2008 | Mahalaha et al. | |
| 2008/0126480 A1 | 5/2008 | Hintermeister et al. | |
| 2008/0133145 A1 | 6/2008 | Ishikawa et al. | |
| 2008/0147472 A1 | 6/2008 | Hitz | |
| 2008/0159495 A1 | 7/2008 | Dahan et al. | |
| 2008/0240401 A1 | 10/2008 | Mergen et al. | |
| 2008/0243515 A1 | 10/2008 | Odinak et al. | |
| 2008/0246592 A1 | 10/2008 | Waalkes et al. | |
| 2008/0250099 A1 | 10/2008 | Shen et al. | |
| 2008/0313260 A1 | 12/2008 | Sweet et al. | |
| 2009/0013255 A1 | 1/2009 | Yuschik et al. | |
| 2009/0037228 A1 | 2/2009 | Engel | |
| 2009/0046846 A1 | 2/2009 | Lew et al. | |
| 2009/0119162 A1 | 5/2009 | Kaplan | |
| 2009/0210535 A1 | 8/2009 | Whitman, Jr. | |
| 2009/0228264 A1 | 9/2009 | Williams et al. | |
| 2009/0245500 A1* | 10/2009 | Wampler .......... H04M 3/42382 379/265.09 |
| 2009/0252318 A1 | 10/2009 | Smith et al. | |
| 2009/0281967 A1 | 11/2009 | Jaffer et al. | |
| 2010/0036838 A1 | 2/2010 | Ellis | |
| 2010/0106603 A1 | 4/2010 | Dey et al. | |
| 2010/0185493 A1 | 7/2010 | Kaplan | |
| 2010/0262650 A1 | 10/2010 | Chauhan et al. | |
| 2010/0332287 A1 | 12/2010 | Gates et al. | |
| 2010/0332603 A1 | 12/2010 | Sun et al. | |
| 2011/0029573 A1 | 2/2011 | Li et al. | |
| 2011/0050423 A1 | 3/2011 | Cova et al. | |
| 2011/0055403 A1 | 3/2011 | Balachandran et al. | |
| 2011/0091021 A1 | 4/2011 | Adkar et al. | |
| 2011/0119231 A1 | 5/2011 | Namburu et al. | |
| 2011/0131652 A1 | 6/2011 | Robinson et al. | |
| 2011/0145275 A1 | 6/2011 | Stewart | |
| 2011/0161488 A1 | 6/2011 | Anderson et al. | |
| 2011/0181594 A1 | 7/2011 | Jung et al. | |
| 2011/0238409 A1 | 9/2011 | Larcheveque et al. | |
| 2011/0282995 A1 | 11/2011 | Gass et al. | |
| 2011/0288897 A1* | 11/2011 | Erhart ............... G06F 17/30705 705/7.13 |
| 2012/0036069 A1 | 2/2012 | Silvestre et al. | |

OTHER PUBLICATIONS

Kozierok, Robyn et al., "A Learning Interface Agent for Scheduling Meetings", Intelligent User Interfaces '93, 1992, pp. 81-88.
Lee, Wei-Po et al., "Intelligent agent-based systems for personalized recommendations in Internet commerce", Expert Systems with Applications 22, No. 4, 2002, pp. 275-284.
Lewis, Michael, "Designing for Human-Agent Interaction", AI Magazine, vol. 19, No. 2, 1998, pp. 67-78.
Maes, Pattie et al., "Learning Interface Agents", AAAI vol. 93, 1993, pp. 459-465.
Merriam-Webster, "automated teller", Dictionary, 2014, 1 page.
Merriam-Webster, "automated teller machine", Dictionary, 2014, 1 page.
Merriam-Webster, "predict", Dictionary, 2015, 1 page.
Merriam-Webster, "representative", Dictionary, 2014, 1 page.
Mulvehill, Alice M. et al., "Human interaction with Software Agents (HISA)", BBN-8291. BBNT Solutions LLC Columbia MD, 2000, pp. i-vi, 1-62.
Nissen, Mark E., "Agent-Based Supply Chain Integration", Information Technology and Management 2, No. 3, 2001, pp. 289-312.
Parasuraman, Raja et al., "A Model for Types and Levels of Human Interaction with Automation", IEEE Transactions on Systems, Man and Cybernetics-Part A: Systems and Humans, vol. 30, No. 3, May 2000, pp. 286-297.
Syrijakow, et al., Interactive Web-based Animations for Teaching and Learning, 2000, pp. 1651-1659.
Varde, et al., "MatML: XML for Information Exchange with Materials Property Data", 2006, pp. 47-54.
Varde, et al., "Semantic Extensions to Domain-Specific Makeup Languages", 2004, 6 pages.

\* cited by examiner

AUTOMATED ASSISTANCE FOR CUSTOMER CARE CHATS

CROSS-REFERENCE TO RELATED APPLICATIONS

The present application is a continuation of U.S. patent application Ser. No. 15/424,729, filed Feb. 3, 2017, titled "AUTOMATED ASSISTANCE FOR CUSTOMER CARE CHATS," now U.S. Pat. No. 10,051,123, which is a continuation of U.S. patent application Ser. No. 14/739,234, filed Jun. 15, 2015, issued as U.S. Pat. No. 9,635,176, titled "AUTOMATED ASSISTANCE FOR CUSTOMER CARE CHATS," which is a continuation of U.S. Pat. No. 9,083,561 B2 titled "AUTOMATED ASSISTANCE FOR CUSTOMER CARE CHATS," and filed on Oct. 6, 2010. The disclosures of these documents, including the specification, drawings, and claims, are incorporated herein by reference in their entirety.

BACKGROUND

Field of the Disclosure

The present disclosure generally relates to providing automated assistance during a communication session. More particularly, the present disclosure relates to providing automated assistance to a customer care agent during an on-line communication session.

Background Information

On-line communication sessions have recently been incorporated into customer care processes as a supplement for, or alternative to, interactive voice response systems. Customer care satisfaction rates are generally higher with on-line communication sessions than with interactive voice response systems. Furthermore, customer care agents are typically able to engage in multiple communication sessions at one time.

DETAILED DESCRIPTION

Figure 1:
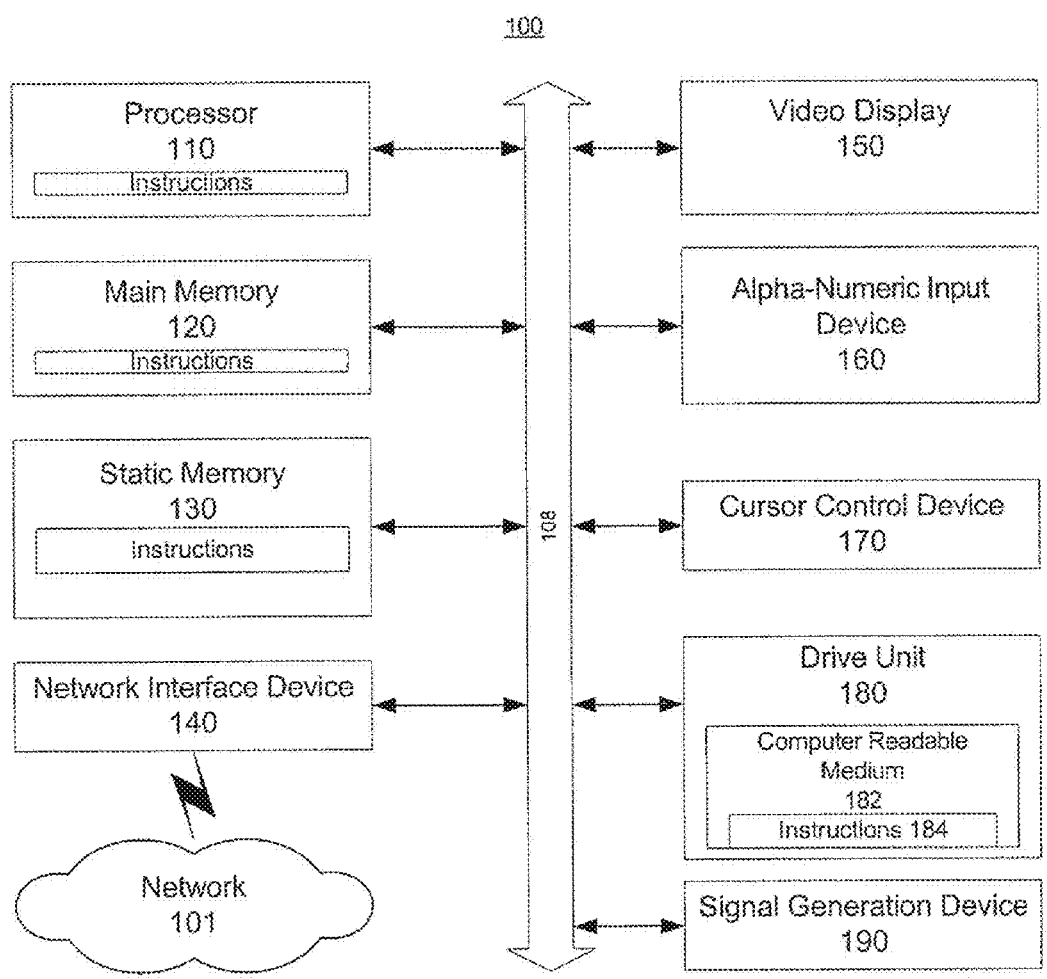
FIG. 1 shows an exemplary general computer system that includes a set of instructions for providing automated assistance to an agent.

In view of the foregoing, the present disclosure, through one or more of its various aspects, embodiments, and/or specific features or sub-components, is thus intended to bring out one or more of the advantages as specifically noted below.

According to a non-limiting embodiment of the present disclosure, an apparatus provides automated assistance to an agent. The apparatus includes a receiver that receives a client communication from a client terminal via a network. A processor processes the received client communication and determines a plurality of agent statements based on the processed and received client communication. A display displays the plurality of agent statements. An input receives an agent communication from the agent. The agent communication is selected from a custom statement that is input by the agent and one of the plurality of agent statements that is selected by the agent. A transmitter transmits the agent communication to the client via the network.

According to one aspect of the present disclosure, the processor further processes a previous agent communication input by the agent and determines the plurality of agent statements based on the processed and received client communication and the processed previous agent communication.

According to another aspect of the present disclosure, the processor queries a backend system to determine the plurality of agent statements.

According to yet another aspect of the present disclosure, the processor processes the received client communication based on natural language processing.

According to still another aspect of the present disclosure, the apparatus includes an automated agent that automatically selects one of the plurality of agent statements as the agent communication.

According to an additional aspect of the present disclosure, the apparatus includes a communication dump that stores an automated assistance session in association with the client terminal. The automated assistance session includes the client communication, the plurality of agent statements, and the agent communication. A restorer restores the automated assistance session in response to the client terminal disconnecting from the network and reconnecting with the network.

According to another aspect of the present disclosure, the agent communication comprises the custom statement that is input by the agent and the one of the plurality of agent statements that is selected by the agent.

According to another embodiment of the present disclosure, a method for providing automated assistance to an agent includes: receiving a client communication from a client terminal via a network; processing the received client communication; determining a plurality of agent statements based on the processed and received client communication; displaying the plurality of agent statements on a display; receiving an agent communication from the agent; and transmitting the agent communication to the client terminal via the network. The agent communication is selected from a custom statement that is input by the agent and one of the plurality of agent statements that is selected by the agent.

According to one aspect of the present disclosure, the method further includes processing a previous agent communication input by the agent. In this regard, the plurality of agent statements is based on the processed and received client communication and the processed previous agent communication.

According to another aspect of the present disclosure, the method further includes querying a backend system to determine the plurality of agent statements.

According to yet another aspect of the present disclosure, the received client communication is processed based on natural language processing.

According to still another aspect of the present disclosure, the method further includes automatically selecting one of the plurality of agent statements as the agent communication.

According to an additional aspect of the present disclosure, the method further includes storing an automated assistance session in association with the client terminal. The automated assistance session includes the client communication, the plurality of agent statements, and the agent communication. The automated assistance session is restored in response to the client terminal disconnecting from the network and reconnecting with the network.

According to another aspect of the present disclosure, the agent communication comprises the custom statement that is input by the agent and the one of the plurality of agent statements that is selected by the agent.

According to another embodiment of the present disclosure, a non-transitory computer-readable medium for providing automated assistance to an agent includes a client communication code segment that, when executed, receives a client communication from a client terminal via a network. A processing code segment, when executed, processes the received client communication. An agent statement code segment, when executed, determines a plurality of agent statements based on the processed and received client communication. A displaying code segment, when executed, displays the plurality of agent statements on a display. An agent communication code segment, when executed, receives an agent communication from the agent. The agent communication is selected from a custom statement that is input by the agent and one of the plurality of agent statements that is selected by the agent. A transmitting code segment, when executed, transmits the agent communication to the client terminal via the network.

According to one aspect of the present disclosure, the processing code segment further processes a previous agent communication input by the agent, and the agent statement code segment determines the plurality of agent statements based on the processed and received client communication and the processed previous agent communication.

According to another aspect of the present disclosure, the agent statement code segment queries a backend system to determine the plurality of agent statements.

According to yet another aspect of the present disclosure, the processing code segment processes the received client communication based on natural language processing.

According to still another aspect of the present disclosure, the medium includes an automated agent code segment that, when executed, automatically selects one of the plurality of agent statements as the agent communication.

According to an additional aspect of the present disclosure, the medium includes a storage code segment that, when executed, stores an automated assistance session in association with the client terminal. The automated assistance session comprises the client communication, the plurality of agent statements, and the agent communication. A restoration code segment restores the automated assistance session when the client terminal disconnects from the network and reconnects with the network.

FIG. 1 is an illustrative embodiment of a general computer system that includes a set of instructions for providing automated assistance as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video, or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid-state display, or a cathode ray tube (CRT). Additionally, the computer system 100 may include an alpha-numeric input device 160, such as a keyboard, another input device (not shown), such as a remote-control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video, or data over the network 101. Further, the instructions 184 may be transmitted or received over the network 101 via the network interface device 140.

According to the present disclosure, during a communication session between an agent or representative and a client, automated assistance is provided to the agent or representative. The automated assistance may consist of automatically generated phrases, prompts, or statements that may be used to guide or assist the agent or representative during the communication session with the client. As such, the agent or representative is able to more efficiently and expeditiously communicate with the client during the communication session, thereby enhancing the appeal and effectiveness of the communication session to the client while enabling the agent or representative to engage in multiple communication sessions with multiple clients. Furthermore, the agent or representative may be guided or trained during the communication sessions via the automatically generated phrases, prompts, or statements.

Figure 2:
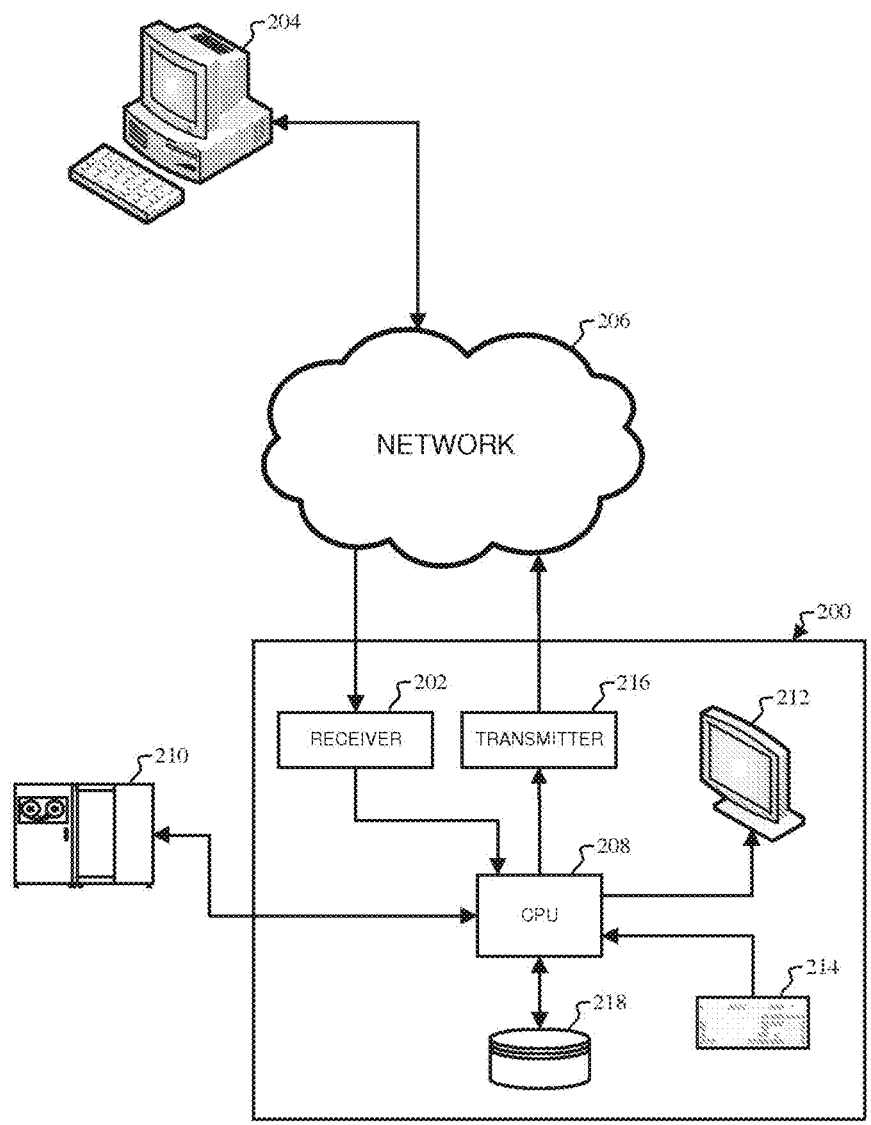
FIG. 2 shows an exemplary apparatus for providing automated assistance to an agent, according to an aspect of the present disclosure.

FIG. 2 shows an exemplary apparatus 200 for providing automated assistance to an agent. The agent may be a customer service agent or a customer service representative. Of course, those skilled in the art appreciate that the agent is not limited to an agent per se. For example, the agent may be a person or thing acting on behalf of himself, herself, or itself.

The apparatus 200 includes a receiver 202 that receives a client communication from a client terminal 204 via a network 206. The client communication may be a textual communication, audible communication, visual communication, or any other form of communication generally known or understood in the art. Of course, those skilled in the art appreciate that the client communication may further be a combination of known forms of communications. Moreover, the client communication is not limited to being from a client per se. For example, the client communication may be from a prospective client or any individual or thing, such as, but not limited to, an automated system.

The client terminal 204 is shown in FIG. 2 as a computer. However, in alternative embodiments, the client terminal 204 may be an IP telephone, smartphone, personal data assistant, cellular telephone, or any other device that is capable of transmitting and receiving communications. Moreover, as set forth above, the client terminal 204 is not limited to being a terminal of a client per se. That is, the client terminal 204 may be a terminal of a prospective client, individual, or thing.

The network 206 is shown in FIG. 2 as a wireless network. However, in alternative embodiments, the network 206 may be a wired network. The network 206 may be, but is not limited to, a local area network, a wide area network, the Internet, a telephony network, or any other network commonly known and understood in the art.

The apparatus 200 includes a processor 208 that processes the received client communication. The processor 208 further determines a plurality of agent statements based on the processed and received client communication. The agent statements may be, but are not limited to, textual communications, visual communications, and audible communications. For example, the agent statements may include phrases, single words, graphics, charts, or any other communications. As a whole, the agent statements may include different types of communications. Furthermore, each agent statement itself may be a combination of different types of communications. The agent statements may be broad, nondescript statements, such as, for example, "I am testing your line" and "please bear with me." Additionally, or alternatively, the agent statements may be tailored to the client communication, such as, for example, specific answers to the client communication and inquiries based on the client communication. Of course, those skilled in the art appreciate that the agent statements are not to be limited to the examples described above.

In an embodiment of the apparatus 200, the processor 208 may further process a previous agent communication that was input by the agent. The processor 208 may determine the plurality of agent statements based on the processed and received client communication and the processed previous agent communication. In this regard, the processor 208 may process a dialogue, or subset thereof, between the client and the agent. In such an embodiment, the processor 208 may determine the agent statements based on the context and scope of the dialogue, or subset thereof. The processor 208 may analyze the interaction between the client and the agent to determine appropriate responses for the agent and to predict future inquiries and replies of the agent.

In the embodiment described above, the previous agent communication is generally described as a previous communication between the agent and the client. However, in alternative embodiments, the previous agent communication may be between the agent and another client. Furthermore, in additional embodiments, the previous agent communication may be between a different agent and the client, or between a different agent and a different client. The processor 208 may query a database of stored communications to determine the previous agent communication. The processor 208 may query the database based on the client communication. In this regard, the processor 208 may query the database based on the client communication of a present communication session to determine past communication sessions having similar client communications in order to determine the scope and content of the present communication session.

In an embodiment of the present application, the processor 208 may query a backend system 210 to determine the plurality of agent statements. The backend system 210 may provide information related to the client for personalizing the agent statements to the client. In a non-limiting and exemplary embodiment of the present application in which a customer service representative is communicating with a client, the backend system 210 may provide personal information of the client, such as, but not limited to, the client's name, gender, address, or location. The backend system 210 may additionally, or alternatively, provide demographic information, billing information, an order history, past communications, or any other information related to the client. Furthermore, the backend system 210 may additionally, or alternatively, provide information unrelated to the client, such as, but not limited to, model answers, statistical information, product information, or customer service center information. The backend system 210 may provide any information which is required by the agent in order to eliminate the need for the agent to manually find the information. For example, the backend system 210 may eliminate the need for the agent to launch and submit queries through a graphical user interface or to physically search through a reference.

In an embodiment of the present application, the processor 208 may determine the agent statements using natural language processing. In this regard, the agent statements may be customized suggestions based on customer information and the dialogue between the client and the agent. The processor 208 may determine the agent statements according to any known and understood methods of natural language processing. Such natural language processing may include, but is not limited to, classification of statements into discourse and domain-semantic categories appropriate to the communication session. Further, category probabilities and precedence rules may be applied and presented, along with a plurality of possible agent statements specific to the classifier categories. Additionally, a taxonomy of domain-semantic categories can be implemented as part of such natural language processing, so that the agent is presented with a selection of statements that will further the communication session by asking for specific information missing in an initial request where the information will allow more specific action. Of course, those skilled in the art appreciate that the processor 208 may also determine the agent statements by methods other than natural language processing.

The apparatus 200 includes a display 212 that displays the agent statements. The agent statements may be displayed on a list. In an embodiment of the present application, the agent statements are displayed on the list based upon priority or frequency of use. The list may be cleared each time the processor 208 determines new agent statements that are to be displayed on the list. Alternatively, the agent statements may be cumulatively added to an existing list. In this regard, the list may be structured as a queue. In embodiments of the present application, an agent statement may be deleted from a list manually by the agent, after a predetermined period of time, upon generation of new agent statements, when more than a predetermined number of agent statements exist, or when the agent selects the agent statement to be transmitted to the client.

The apparatus 200 includes an input 214 that receives an agent communication from the agent. The input 214 is shown in FIG. 2 as a keyboard. However, those skilled in the art appreciate that additional, or alternative, input devices may also be used, such as, but not limited to, a microphone, mouse, joystick, or controller. Furthermore, those skilled in the art appreciate that multiple inputs may also be used.

In an embodiment of the present application, the agent communication may be a custom statement that is input by the agent or one of the agent statements that is selected by the agent. In this regard, the agent may determine whether to input a custom statement or to select one of the agent statements as determined by the processor 208. As such, the efficiency of the agent is increased by enabling the agent to select one of the automatically generated agent statements while the personality of the agent is maintained by enabling the agent to input a customized statement.

In another embodiment of the present application, the agent communication may further be a combination of a custom statement that is input by the agent and one of the agent statements that is selected by the agent. For example, the agent statements may be templates that the agent customizes via the input 214. Additionally, or alternatively, the agent may be able to edit a selected agent statement via the input 214. In this regard, the efficiency of the agent is again increased while maintaining the personality of the agent.

In an embodiment of the apparatus 200, the apparatus 200 includes an automated agent that automatically selects one of the agent statements as the agent communication. In such an embodiment, the agent communication is not received via the input 214. Rather, the automated agent interacts directly with the client terminal 204. The automated agent may automatically select one of the agent statements based on a priority of the agent statements or based on a frequency of use of the agent statements. In alternative embodiments, the automated agent may automatically select one of the agent statements based upon other known methods, such as, but not limited to, a history of an agent's selection of one of the agent statements.

In an embodiment of the apparatus 200, the agent may selectively engage and disengage the automated agent via the input 214. Additionally, or alternatively, the automated agent may be automatically engaged or disengaged in response to a predetermined condition. For example, the automated agent may be engaged or disengaged based upon a content of a received client communication. Additionally, or alternatively, the automated agent may be engaged or disengaged based upon the elapse of a predetermined period of time or based upon the activity or inactively of the agent. Of course, those skilled in the art appreciate that the automated agent may be engaged and/or disengaged based upon additional, or alternative, conditions.

As shown in FIG. 2, the apparatus 200 includes a transmitter 216 that transmits the agent communication to the client terminal 204 via the network 206. The transmitter 216 may automatically transmit the agent communication to the client terminal 204 in response to the input 214 receiving the input of the custom statement from the agent, the input 214 receiving the selection of one of the agent statements by the agent, and the automated agent automatically selecting one of the agent statements. Alternatively, the transmitter 216 may transmit the agent communication to the client terminal 204 in response to an input from the agent.

In the embodiment of the apparatus 200 as shown in FIG. 2, the apparatus 200 further includes a communication dump 218. The communication dump 218 stores an automated assistance session in association with the client terminal 204. The automated assistance session may comprise any combination of the client communications, the agent statements, and the agent communications that are transmitted between the client terminal 204 and the apparatus 200 during a communication session. If the communication session is interrupted, such as when the client terminal 204 is unexpectedly disconnected from the network 206, the communication session may be restored when the interruption ceases to exist, such as when the client terminal 204 reconnects with the network 206.

Figure 3:
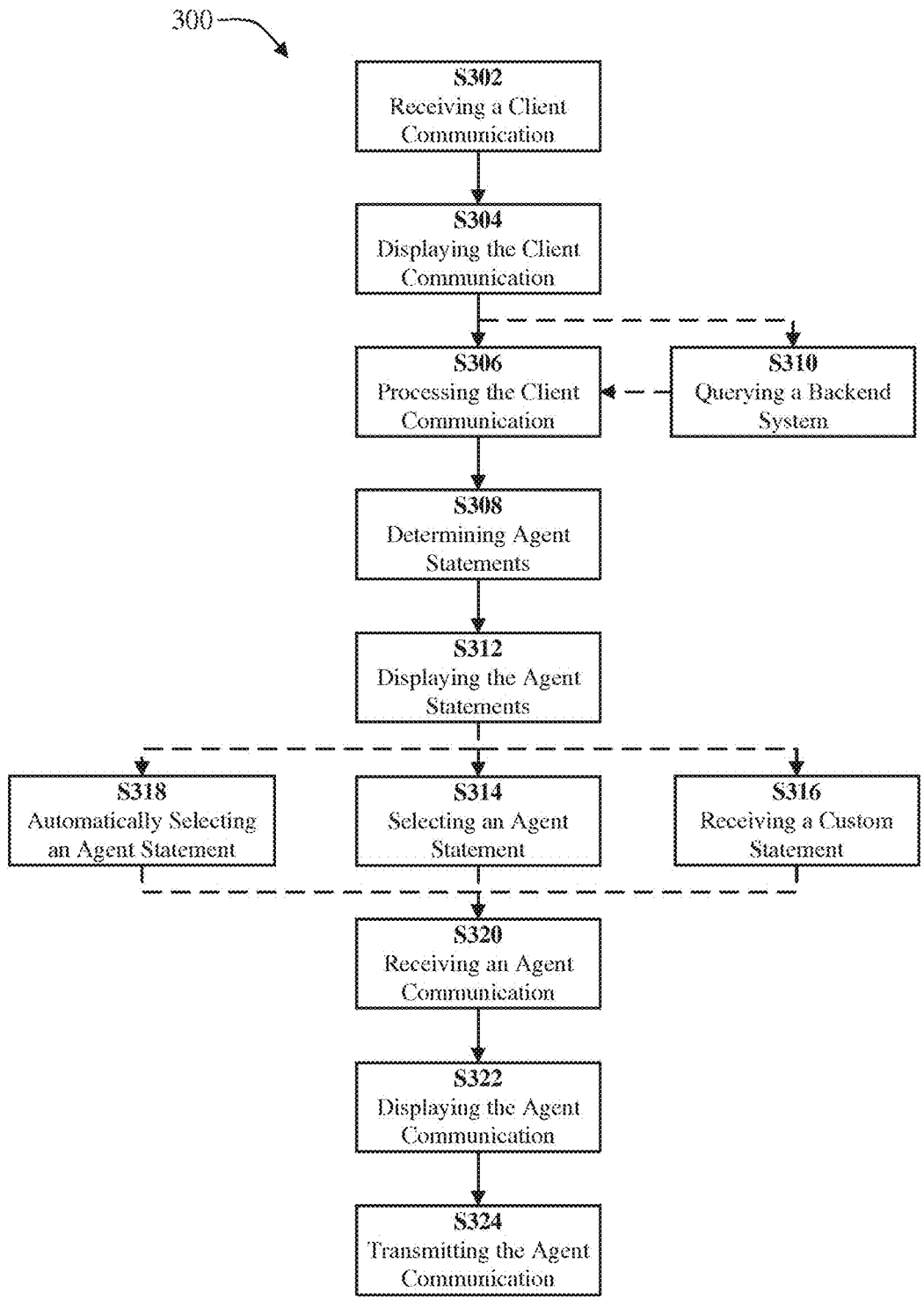
FIG. 3 shows an exemplary method for providing automated assistance to an agent, according to an aspect of the present disclosure.

FIG. 3 shows an overview of an exemplary method 300 for providing automated assistance to an agent. At S302, a client communication is received from a client terminal via a network. The client communication may be displayed on a display of the agent at S304. At S306, the received client communication is processed, and, at S308, a plurality of agent statements is determined based on the processed and received client communication. In an embodiment of the method 300, the plurality of agent statements is determined based on natural language processing.

According to such an embodiment, when the communication session is a chat session, such natural language processing may include, but is not limited to, the classification of chat requests into discourse and domain-semantic categories appropriate to the chat domain. Further, category probabilities and precedence rules can be applied and presented, along with a plurality of possible agent chat responses specific to the classifier categories. Additionally, a taxonomy of domain-semantic categories can be implemented as part of such natural language processing, so that the chat agent is presented with a selection of chat responses that will further the dialog by asking for specific information missing in an initial chat request where said information will allow more specific action.

As shown in FIG. 3, in an embodiment of the method 300, a backend system may be queried at S310 to determine the plurality of agent statements. The back-end system may be queried based on the received client communication or based on information relating to a user of the client terminal. The backend system may include predetermined responses for the agent, personal information relating to the user of the client terminal, or a database of communication transcripts. Of course, those skilled in the art appreciate that the backend system may include any additional, or alternative, information for determining the plurality of agent statements.

At S312, the agent statements are displayed on the display of the agent. Thereafter, as shown in FIG. 3, the agent may select one of the agent statements at S312, the agent may input a custom statement at S316, or an automated agent may automatically select one of the agent statements at S318. The one of the agent statements selected by the agent, the custom statement, or the agent statement automatically selected by the automated agent is received as an agent communication at S320. In an alternative embodiment of the method 300, the agent communication may be a combination of one of the agent statements and a custom statement. At S322, the agent communication may be displayed on the display of the agent. At S322, the agent statement is transmitted to the customer terminal.

Figure 4:
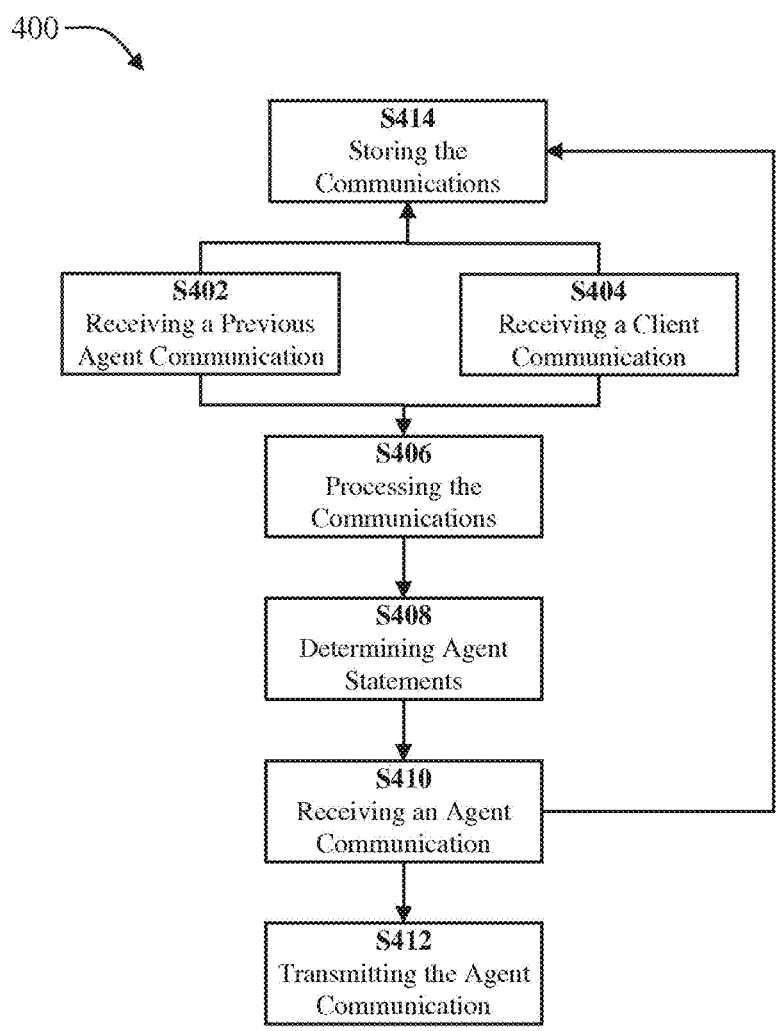
FIG. 4 shows another exemplary method for providing automated assistance to an agent, according to an aspect of the present disclosure.

FIG. 4 shows an overview of another exemplary method 400 for providing automated assistance to an agent. According to the method 400, a previous agent communication is received at S402 and a client communication is received at S404. In other words, a dialogue between the agent and a client is received at S402 and S404. At S406, the previous agent communication and the client communication are processed. The communications may be processed using natural language processing. At S408, a plurality of agent statements is determined based on the processed previous agent communication and client communication. At S410, an agent communication is received. The agent communication may be a custom statement that is input by the agent or one of the agent statements that is selected by the agent. The agent communication is transmitted to the client at S412.

In the method 400 as shown in FIG. 4, the previous agent communication, the client communication, and the agent communication are stored in a communication dump at S414. In this regard, in the event that a communication session between the agent and the client is interrupted, the communication session may be restored when the interruption ceases to exist.

Figure 5:
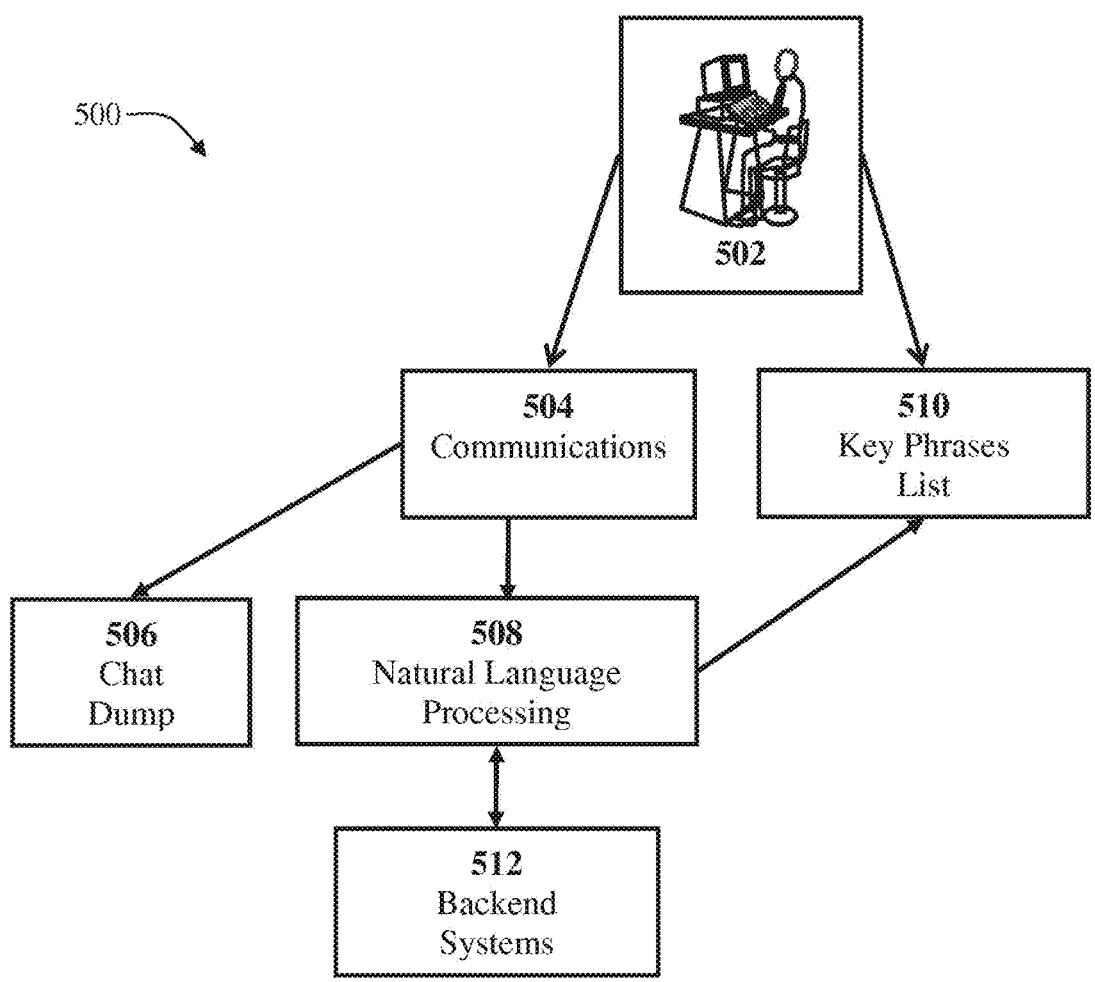
FIG. 5 shows an exemplary process for providing automated assistance to an agent, according to an aspect of the present disclosure.

FIG. 5 shows an overview of an exemplary process 500 for providing automated assistance to an agent. According to the process 500, an agent 502 interacts with a customer by transmitting and receiving communications 504 to and from the customer. The communications 504 are stored in a chat dump 506 so that a communication session between the agent 502 and the customer may be restarted in the event that the communication session is interrupted. A natural language processor 508 processes the communications 504 transmitted to and received from the client to determine a list of key phrases 510. The list of key phrases 510 is provided to the agent 502 to assist the agent 502 in communicating with the customer. As shown in FIG. 5, the natural language processor 508 may query a backend system 512 to determine the key phrases list 510.

As described herein, automated guidance may be provided to an agent or representative to assist in customer service. The automated guidance enables the agent or representative to efficiently and expeditiously interact with a client. However, since the automated guidance is only partially automated, the quality of the interaction between the agent or representative and a client is maintained. In other words, providing the agent or representative with the option of inputting a custom statement or selecting from automated statements improves the efficiency of the agent or representative while maintaining the personality of the agent or representative. As such, the appeal and effectiveness of the customer service is improved. Moreover, the agent or representative is able to competently engage in multiple communication sessions with multiple clients without sacrificing the quality of the customer service.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, although the description herein references agents and clients, the apparatus, methods, and computer-readable medium described herein would be applicable to any individuals and/or things. Similarly, the descriptions herein would be applicable for uses other than providing customer service.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for power over ethernet represent an example of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing automated assistance to an agent, comprising:
    receiving a client communication via a network;
    engaging an automated agent in response to a predetermined condition, the predetermined condition including content of the received client communication and an elapse of a predetermined period of time;
    determining, by the automated agent, a statement based on the client communication and assistance sessions stored in a database, the statement being determined as predicted inquiries and replies to the client communication; and
    transmitting the statement selected by the automated agent to a client terminal via the network.

2. The method of claim 1, further comprising:
    providing the selected statement for display on a terminal associated with the agent.

3. The method of claim 1, wherein upon an interruption of a communication session via the network, the selected statement is stored in a communication dump and transmitted upon termination of the interruption.

4. The method of claim 1, further comprising:
    processing a previous agent communication that is previously received from the agent, wherein the statement is determined based on the client communication and the previous agent communication.

5. The method of claim 1, further comprising:
    storing assistance sessions comprising dialogues between at least one client terminal and at least one agent terminal, wherein the statement is determined based on the client communication and the dialogues.

6. The method of claim 5, wherein the automated agent determines the statement based on a frequency of use within the stored assistance sessions.

7. The method of claim 1, wherein the automated agent determines the statement based on a history of a manual selection of the statement by a particular agent.

8. The method of claim 1, wherein the predetermined condition includes an input being received from the agent.

9. The method of claim 1, wherein the predetermined condition includes an activity or inactivity of the agent.

10. The method of claim 1, wherein the statement is configured to be edited by the agent.

11. A method for providing automated assistance to an agent, comprising:
    receiving a client communication via a network;
    engaging an automated agent in response to a predetermined condition, the predetermined condition including a content of the received client communication and an elapse of a predetermined period of time;
    determining, by the automated agent, a statement based on the client communication, the statement being determined as predicted inquiries and replies to the client communication; and
    causing the statement to be displayed for the agent, wherein the statement is configured to be edited by the agent.

12. The method of claim 11, further comprising:
    transmitting the statement to a client terminal via the network.

13. The method of claim 11, further comprising:
    storing, in a database, assistance sessions comprising dialogues between at least one client terminal and at least one agent terminal.

14. The method of claim 13, wherein determining the statement is further based on the dialogues.

15. The method of claim 13, wherein any of the assistance sessions includes a previous agent communication, the previous agent communication being transmitted by the agent to the at least one client terminal during a communication session, and wherein a plurality of statements is determined based on the client communication and the previous agent communication.

16. The method of claim 11, wherein the automated agent determines the statement based on a frequency of a manual selection of the statement by a particular agent.

17. A non-transitory computer-readable medium having an executable computer program for providing automated assistance that, when executed by a processor, causes the processor to perform operations comprising:
receiving a client communication via a network;
engaging an automated agent in response to a predetermined condition, the predetermined condition including content of the received client communication and an elapse of a predetermined period of time;
determining, by the automated agent, a statement based on the client communication and assistance sessions stored in a database, the statement being determined as predicted inquiries and replies to the client communication; and
transmitting the statement selected by the automated agent to a client terminal via the network.

18. The non-transitory computer-readable medium of claim 17, wherein the operations further comprise:
causing the statement to be displayed for an agent, wherein the statement is configured to be edited by the agent.

19. The non-transitory computer-readable medium of claim 17, wherein the operations further comprise:
storing, in a database, assistance sessions comprising dialogues between at least one client terminal and at least one agent terminal.

20. The non-transitory computer-readable medium of claim 19, wherein any of the assistance sessions include a previous agent communication, the previous agent communication being transmitted by an agent to the client terminal during a communication session, and wherein a plurality of statements is determined based on the client communication and the previous agent communication.

21. The non-transitory computer-readable medium of claim 19, wherein the assistance sessions include dialogues between an agent and the client terminal, and a plurality of statements is determined based on the client communication and the dialogues between the agent and the client terminal.

22. The non-transitory computer-readable medium of claim 19, wherein the automated agent determines the statement based on a frequency of use within the stored assistance sessions.

23. A method for providing automated assistance to an agent, comprising:
receiving a client communication via a network;
engaging an automated agent in response to a predetermined condition, the predetermined condition including content of the received client communication and an activity or inactivity of the agent;
determining, by the automated agent, a statement based on the client communication, the statement being determined as predicted inquiries and replies to the client communication; and
performing either of the following:
transmitting the statement selected by the automated agent to a client terminal via the network; or
causing the statement to be displayed for the agent, wherein the statement is configured to be edited by the agent.

* * * * *